H. F. PHILLIPS.
PORTABLE PUMP.
No. 39,618. Patented Aug. 18, 1863.
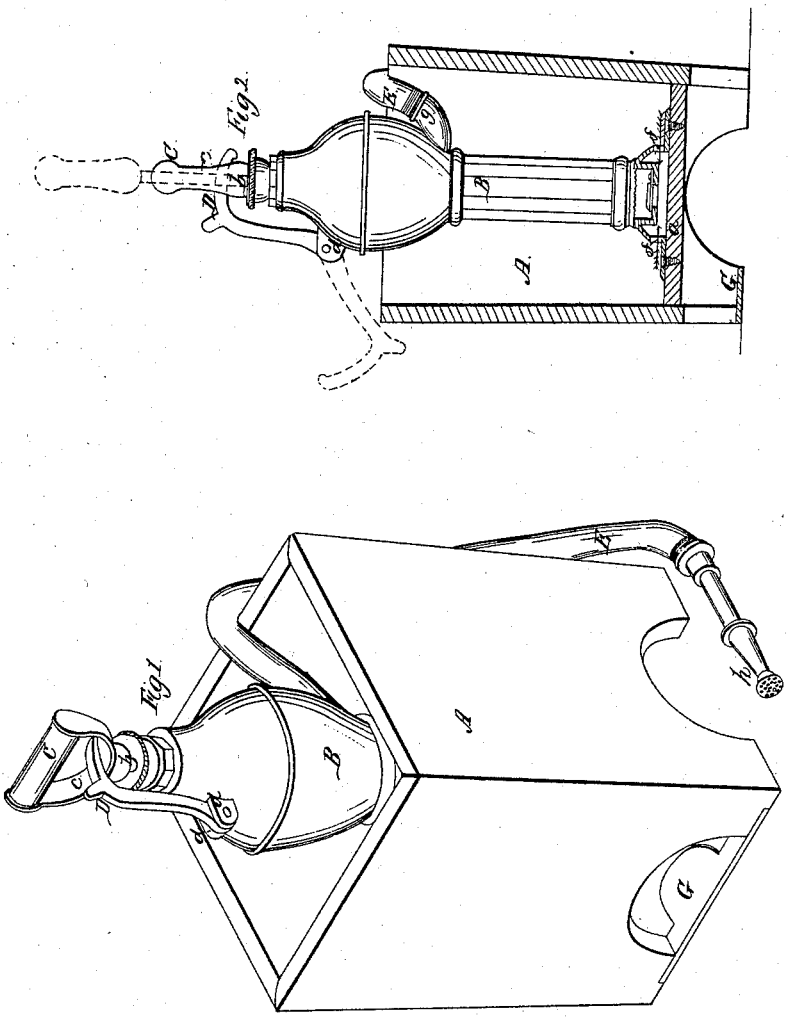

UNITED STATES PATENT OFFICE.

H. F. PHILLIPS, OF ILION, ASSIGNOR TO DOWNS & CO., OF SENECA FALLS, NEW YORK.

IMPROVEMENT IN PORTABLE PUMPS.

Specification forming part of Letters Patent No. 39,618, dated August 18, 1863.

*To all whom it may concern:*

Be it known that I, H. F. PHILLIPS, of Ilion, in the county of Herkimer and State of New York, have invented certain new and useful Improvements in Portable Garden-Pumps; and I do hereby declare that the following is a full and exact description thereof, reference being had to the accompanying drawings, making part of this specification.

Figure 1 is a perspective view of my improved garden-pump, and Fig. 2 a central vertical section of the receptacle or bucket and the base of the pump proper, the body of the same being shown in elevation.

Like letters designate corresponding parts in both figures.

My invention consists in the use of a force-pump, in connection with a suitable receptacle or vessel, so arranged as to be easily transported from place to place, and the whole constructed and operating substantially as hereinafter described.

A receptacle or vessel, A, of a capacity to be easily carried by hand when filled with water, is provided, preferably of the shape represented in the drawings, but, if desirable, of the form of an ordinary bucket or pail, or any other that is most convenient. Within this vessel, and usually to its bottom $a$, is secured by means of screws passing through the base-flange, or in any convenient manner, a force-pump, B, as represented, of any ordinary construction that will accomplish the purpose designed and allow the piston-rod $b$ to extend upward vertically entirely through the pump. At the upper end of this piston-rod is secured a handle, C, of sufficient size to be seized by the hand, and having preferably beneath a bow, $c$, substantially of the form represented in Fig. 1. On the outside of the air-chamber of the pump, at a suitable position, are made bearings $d\ d$, to which is jointed the shank of a catch or hook, D, which catches over the bow of the piston-handle when in its lowest position, and thus retains it in that condition as long as desired. The pump proper is provided at its bottom with suitable induction-openings, $f\ f$, admitting the water to the valve, and also at the proper position with an eduction-outlet, $g$, to which is secured a short flexible tube, E, provided with a suitable nozzle, $h$, for distributing the water. The receptacle A has at its bottom, on one side, a stirrup, formed by an open space in the side of sufficient size to admit the foot, and a metallic tread-piece, G, across it at its base. Instead of this arrangement, the tread-piece might be made of right-angled shape and secured to the receptacle, with one end projecting outward beyond the base, but I prefer the former arrangement. The use of the stirrup is to assist to hold the receptacle firmly while operating the pump, as will presently be described. The receptacle is filled with water around the pump, and transported to any desirable point, when by working the piston the liquid is distributed over the garden. It is frequently the case that the well or reservoir is situated so far from the garden that the ordinary force-pump cannot be connected with it by an induction-tube. In this case it has been necessary heretofore to connect the induction-pipe with a vessel of water brought for the purpose, the vessel and pump being separate. By the combination of the two in one device, as above described, a great advantage is gained, not only in compactness and simplicity, but in economy—no induction-tube being necessary—as well also in efficiency of action, as the pump possesses more stability and is more easily worked, as it is self-supporting, thus leaving the left hand free to guide the nozzle and direct the stream of water, while the right hand operates the piston. In this form the combined device occupies no more space than the ordinary bucket, and is as easily carried from place to place, and needs no adjustment to be put in working order. By placing the foot in the stirrup G and resting the leg against the top of the receptacle the pump is kept in a perfectly rigid position under the most violent action without effort on the part of the operator, leaving both hands free for other uses.

In carrying or transporting the pump from place to place the catch D is hooked over the bow of the piston-head, as represented by the black lines in the drawings, thereby holding it from rising, and the handle of the piston thus serves as the handle of the receptacle in sustaining the weight. When the piston is o be operated, the catch is disengaged and falls back out of the way, as indicated by the red lines in Fig. 2, leaving the piston free. This arrangement is very convenient and effective, saving the extra cost of a bail to the bucket, which would be an impediment to the device.

What I claim as my invention, and desire to secure by Letters Patent, is—

1. The pump B, hand bucket A, handle C c, and catch D, or equivalent, so arranged and combined that the said handle shall serve both for operating the pump and as a bail for the bucket, as shown and described.

2. In combination with the foregoing, the stirrup G, or its equivalent, as herein set forth.

In witness whereof I have hereunto signed my name in the presence of two subscribing witnesses.

H. F. PHILLIPS.

Witnesses:
W. H. THOMAS,
ADRIAN P. MATHER.